United States Patent Office 3,507,733
Patented Apr. 21, 1970

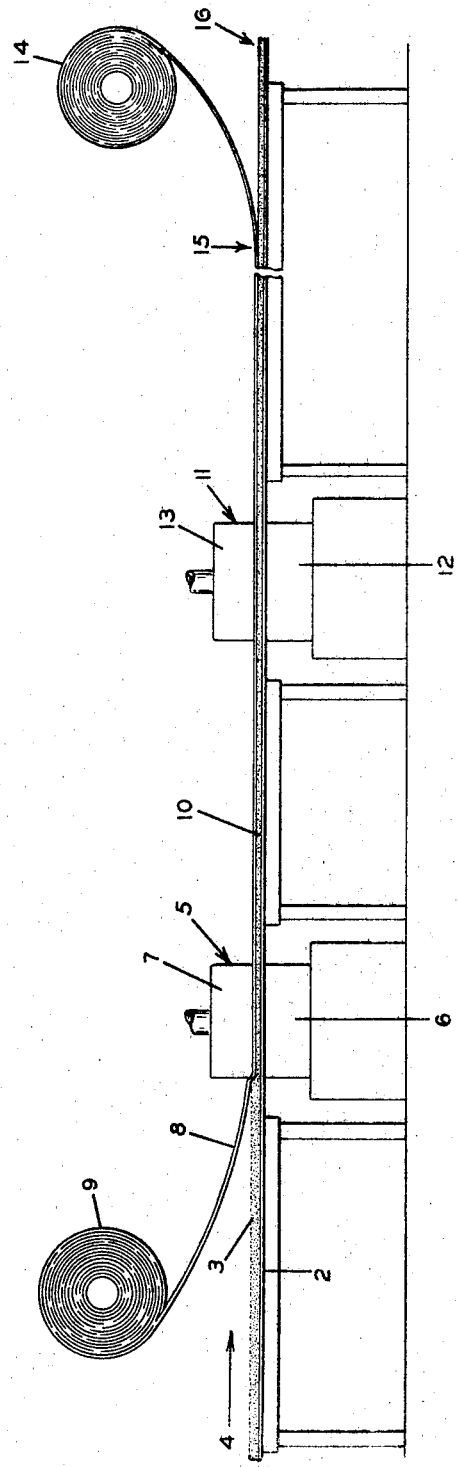

3,507,733
MANUFACTURE OF EMBOSSED FLOOR AND WALL COVERING USING POLYPROPYLENE COATED RELEASE SHEET
Edward P. Davidson, Manheim Township, Lancaster County, Pa., assignor to Armstrong Cork Company, Lancaster, Pa., a corporation of Pennsylvania
Filed Aug. 6, 1964, Ser. No. 387,661
Int. Cl. B32b 7/06, 31/00
U.S. Cl. 156—247                 9 Claims

ABSTRACT OF THE DISCLOSURE

An improved process for forming an embossed decorative surface covering incorporating the use of a release sheet having a facing layer of polypropylene between the thermoplastic resin particles being embossed and the embossing surface.

---

This invention relates to the manufacture of decorative thermoplastic vinyl resin surface coverings and is more particularly concerned with a release material for use in the process of manufacturing decorative thermoplastic vinyl resin floor and wall coverings having an embossed surface.

In the production of resilient sheet floor and wall coverings from thermoplastic vinyl resin compositions, such as compositions formed with filled and unfilled plasticized homopolymers of vinyl chloride and copolymers of vinyl chloride and vinyl acetate, it has been found that, where attempts have been made to produce a decorative surface covering having a deep and intricate type embossing, the use of conventional release paper between the embossing surface and the surface of the vinyl resin decorative surface covering being embossed was inadequate in that the deep and intricate embossing surface tore the paper allowing color to come in contact with the embossing surface. This made it difficult to remove or separate the decorative surface covering and to strip the paper therefrom. Attempts to emboss using cellophane also proved ineffective as the cellophane became brittle and readily tore. The use of various release agents between the embossing surface and the thermoplastic vinyl resin sheet goods, i.e., calcium stearate, stearic acid, paraffin oil, silicon type release agents, and other conventional release agents, was found to have a tendency to dirty the face of the goods.

Thus the primary object of this invention is to form resilient decorative thermoplastic vinyl resin surface coverings having embossing of good detail impressed therein using standard embossing techniques.

An ancillary object of this invention is to provide a release material for use in the production of embossed floor and wall coverings which will provide faithful embossing details when the coverings are embossed with standard embossing plates or embossing rolls.

I have found that I am able to provide these and other objects and am able to produce a resilient decorative surface covering useful for floor and wall coverings which is in turn provided with deep and intricate type embossing by utilizing a special release sheet between the embossing surface and the goods being embossed. The special release sheet which is the subject of this invention is comprised of a dimensionally stable backing layer having a facing layer of polypropylene. By way of example I have found that suitable materials for use as a release sheet may be formed by extrusion coating a polypropylene layer onto a backing of kraft paper, the kraft paper providing dimensional stability in the formed sheet. Other dimensionally stable backing materials such as cellophane may be used equally as well for the backing, the critical feature of the invention residing in the use of polyproylene as a facing layer in contact with the surface covering being embossed.

The accompanying drawing illustrates one embodiment for practicing this invention. In the illustration a sheet of backing material 2 having a loose layer of granulated thermoplastic vinyl resin composition 3 positioned thereon is moved generally in the direction of the arrow 4 and is fed into a flat bed press 5 having a smooth bottom platen 6 and a top platen 7. A sheet 8 of polypropylene laminated to a paper backing is interposed between the press and the loose granular material with the polypropylene facing the granular layer 3. This release sheet 8 is supplied as a continuous sheet from the roll 9. After initial compaction of the granulated composition 3 by the press 5 the newly compacted sheet 10 on carrier 2 with the release paper still in engagement with the surface moves to the press 11 having a smooth bottom platen 12 and a top embossing platen 13 which is provided with a plate having an outwardly projecting design. This press finally consolidates the sheet and presses a design into the surface to a substantial depth. The impressed release sheet remains in engagement with the surface of the thermoplastic sheet as the sheet leaves the press. At this point the temperature of the sheet is reduced and the release sheet is stripped from the embossed thermoplastic vinyl resin decorative surface covering.

The following example will illustrate a specific embodiment of this invention:

EXAMPLE

A series of stencils, such as the stencil described in Harris and Landis, U.S. Patent No. 3,133,312, were utilized to lay up a design on the backing 2, the series of stencils being used to lay up particles of granulated composition of different colors, the compositions being of the type described in McKee, U.S. Patent No. 3,101,241, to form the layer of particles 3. The layer of particles 3 on the backing 2 were then fed into the flat bed press 5 where they were initially compacted into sheet form for 12 seconds at a pressure of 400 p.s.i. and at a temperature of 280–310° F. At the flat bed press 5 a release sheet 8, formed of a kraft paper backing having an extruded film of polypropylene on the surface thereof, was interposed between the press platen 7 and the loose granular material 3, the film of polypropylene being in contact with the granular material 3. After the initial compaction the consolidated sheet 10 to which the release sheet 8 was adhered was fed to the press 11 where for 6 seconds a pressure of 1400 p.s.i. and a temperature of 290–330° F. were utilized to finally consolidate and fuse the sheet 10. Here the outwardly projecting design of the embossing platen 13, which was in register with the design laid up by the series of stencils, impressed the embossed design into the sheet 10. At the press 11 the kraft paper was torn during the embossing and compaction cycle; however, the polypropylene kept the embossing platen 13 from coming into contact with the thermoplastic sheet 10. After the sheet 10 was embossed at the press 11 it was cooled to 130°–150° F. and at this temperature the polypropylene layer possessed sufficient strength so that it, along with the torn kraft backing, was readily stripped from the embossed decorative surface covering 16 at 15. The embossed goods 16 had a surface having a low level of gloss with an embossed detail mirroring the detail of the embossing platen 13. The polypropylene release sheet stripped cleanly therefrom and there was no bubble or pin hole formation in the embossed portions or other area of the decorative surface of the sheet goods 16.

In this example the release sheet had a kraft paper backing 5 mils in thickness and a polypropylene facing, formed by extruding a polypropylene having a melt flow of 30, as a film 1½ mils thick.

Generally speaking a polypropylene having a melt flow of from 0.5 to 200 may be used as the facing layer of the release sheet, with polypropylene having melt flows of from 4 to 40 being preferred. The melt flows are all determined in accordance with the general ASTM D1238–57T procedure, substituting a temperature of 230° C. for 190° C. at the same load of 2160 grams.

The thickness of the polypropylene portion of the laminate release layer should be at least one mil to eliminate pin holes and provide complete coverage of the backing material. For economical reasons it will be obvious that the thickness should be kept near this minimum and a 1 to 3 mil range of thickness for the polypropylene layer is probably most realistic.

Although the example discloses the use of two presses in forming the embossed sheet goods, it is possible to provide the same functions utilizing a single press. Additionally, it would be possible to practice the invention utilizing an embossing roll if such a method of manufacture were desired.

Formation of embossed sheet goods having the desired physical properties requires pressures of from 1000 p.s.i. to 2000 p.s.i. and temperatures of from 280° F. to 350° F., the optimum pressures and temperatures depending upon the dwell time of the consolidation and embossing cycle. When two presses are used the initial consolidation preferably is carried out at a pressure of from 100 p.s.i. to 600 p.s.i. and a temperature of from 280° F. to 340° F.

The surface finish of the backing employed in the laminate determines to a large extent the surface finish of the embossed goods. Thus a kraft paper imparts a relatively rough low gloss finish while a clay-coated paper provides a smooth finish. A polypropylene laminate having a Mylar backing provides an extremely smooth finish on the surface of the embossed product. I have also found that the gloss imparted to the goods seems to increase with an increasing molecular weight of the polypropylene used in the laminate.

Although it might appear that films formed from resins other than polypropylene might be used to form the release facing, I have found this not to be the case. Thus, polyethylene film displayed good release but melted into the face of the goods whereas a Mylar film functioned extremely well insofar as release was concerned but tended to round the embossing, introduced surface pin holes, and imparted an undesirably high level of gloss to the embossed goods.

I claim:

1. In a method of forming an embossed decorative surface covering wherein a layer of particles of thermoplastic vinyl resin is embossed, consolidated and fused under heat and pressure, the improvement which comprises interposing a release sheet having a facing layer of polypropylene between said layer of resin particles and the embossing surface, said release sheet having a dimensionally stable backing layer and a polypropylene facing layer of a minimum thickness of one mil.

2. The method in accordance with claim 1 in which the decorative surface covering is embossed, fused and consolidated at a temperature in the range of 280° F. to 350° F. and a pressure in the range of 1000 p.s.i. to 2000 p.s.i.

3. The method in accordance with claim 2 in which the polypropylene has a melt flow of 4 to 40.

4. The method in accordance with claim 3 in which the backing layer is of kraft paper.

5. The method in accordance with claim 3 in which the backing layer is cellophane.

6. The method in accordance with claim 3 in which the backing layer is a clay-coated paper.

7. In a method of forming an embossed decorative floor covering wherein a layer of particles of thermoplastic vinyl resin is consolidated, fused and embossed under heat and pressure, the improvement which comprises interposing a release sheet, having a dimensionally stable backing layer and a facing layer of polypropylene of a minimum thickness of one mil in contact with said layer of resin particles, between said layer and the embossing surface; embossing, fusing, and consolidating said resin layer at a temperature in the range of from 280° F. to 350° F. and under a pressure in the range of from 1000 p.s.i. to 2000 p.s.i.; cooling said consolidated and embossed thermoplastic vinyl resin layer to 130° F. to 150° F. while said layer remains in contact with said release sheet; and stripping said release sheet from the decorative vinyl resin layer.

8. The method in accordance with claim 7 in which the release sheet has a dimensionally stable backing layer and in which the polypropylene facing layer is formed from a polypropylene resin having a melt flow of from 4 to 40.

9. The method in accordance with claim 8 in which the layer of particles of thermoplastic vinyl resin is consolidated under a pressure in the range of from 100 p.s.i. to 600 p.s.i. and at a temperature in the range of from 280° F. to 340° F. prior to the embossing and fusion cycle.

References Cited

UNITED STATES PATENTS

| | | | |
|---|---|---|---|
| 2,710,046 | 6/1955 | Markus et al. | 156—323 X |
| 2,772,141 | 11/1956 | Dunlap | 161—406 X |
| 3,014,828 | 12/1961 | Reese | 161—250 X |
| 3,036,930 | 5/1962 | Grimminger et al. | 161—247 X |
| 3,118,534 | 1/1964 | Groff et al. | 206—59 |

JOHN T. GOOLKASIAN, Primary Examiner

R. A. KILLWORTH, Assistant Examiner

U.S. Cl. X.R.

156—289, 323; 161—406; 264—284, 338